United States Patent [19]
Luo

[11] Patent Number: 5,858,318
[45] Date of Patent: Jan. 12, 1999

[54] METHODS OF SYNTHESIZING HYDROXYAPATITE POWDERS AND BULK MATERIALS

[76] Inventor: Ping Luo, 2843A Forest Ave., Berkeley, Calif. 94705

[21] Appl. No.: 757,849

[22] Filed: Nov. 27, 1996

[51] Int. Cl.$^6$ .................................................. C01B 25/32
[52] U.S. Cl. ........................ 423/308; 423/309; 423/311; 501/1
[58] Field of Search .................................. 423/308, 309, 423/311

[56] References Cited

U.S. PATENT DOCUMENTS

| | | |
|---|---|---|
| Re. 35,340 | 10/1996 | Ichitsuka et al. . |
| 3,929,971 | 12/1975 | Roy ......................................... 423/308 |
| 4,335,086 | 6/1982 | Spencer . |
| 4,371,484 | 2/1983 | Inukai et al. . |
| 4,752,457 | 6/1988 | Toriyama et al. ....................... 423/308 |
| 4,798,886 | 1/1989 | Kato et al. . |
| 4,849,193 | 7/1989 | Palmer et al. ........................... 423/309 |
| 4,874,511 | 10/1989 | Kawasaki et al. . |
| 4,952,323 | 8/1990 | Nakabayashi et al. ................. 423/308 |
| 5,017,518 | 5/1991 | Hirayama et al. . |
| 5,039,408 | 8/1991 | Ichitsuka et al. . |
| 5,082,566 | 1/1992 | Tagaya et al. . |
| 5,108,956 | 4/1992 | Inoue et al. . |
| 5,158,756 | 10/1992 | Ogawa et al. . |
| 5,205,928 | 4/1993 | Inoue et al. . |
| 5,435,822 | 7/1995 | Blouin . |
| 5,441,635 | 8/1995 | Ichitsuka et al. . |

OTHER PUBLICATIONS

Höhling et al., "Quantitative electron microscopic investigations of mineral nucleation in collagen" *Cell Tissue Res.* (1974) 148:11–26.

Posner et al. "Refinement of the hydroxyapatite structure" *Acta Crystallogr.* (1958) 11:308–309.

Hench, "Bioceramics: From concept to clinic" *J. Am. Cer. Soc.* (1991) 74:1487–1510.

Tiselius et al., "Protein chromatography on calcium phosphate columns" *Arch. Biochem. Biophys.* (1956) 65:132–155.

Kadoya et al., "High performance liquid chromatography of proteins on a hydroxyapatite column" *Liquid Chrom.* (1988) 11(14):2951–2967.

Kurtz et al., "Multihormonal induction of hepatic $\alpha_{2u}$-globulin mRNA as measured by hybridization to complementary DNA" *Proc. Natl. Acad. Sci. USA* (1977) 74:4791–4795.

Liu et al., "Plasma–sprayed hydroxyapatite coating: effect of different calcium phosphate ceramics" *J. Mater. Sci. Med.* (1994) 5:147–153.

Tanahashi et al., "Fibrous hydroxyapatite grown in the gel system: effects of pH of the solution on the growth rate and morphology" *J. Mater. Sci. Med.* (1992) 3:48–53.

Li et al., "Process of formation of bone–like apatite layer on silica gel" *J. Ater. Sci. Med.* (1993) 4:127–131.

Yubao et al., "Preparation and characterization of nanograde osteoapatite–like rod crystals" *J. Mater. Sci. Med.* (1994) 5:252–255.

(List continued on next page.)

*Primary Examiner*—Wayne Langel

[57] ABSTRACT

Methods are provided for producing non-porous controlled morphology hydroxyapatite granules of less than 8 $\mu$m by a spray-drying process. Solid or hollow spheres or doughnuts can be formed by controlling the volume fraction and viscosity of the slurry as well as the spray-drying conditions. Methods of providing for homogenous cellular structure hydroxyapatite granules are also provided. Pores or channels or varying size and number can be formed by varying the temperature at which a hydroxyapatite slurry formed in basic, saturated ammonium hydroxide is spray-dried. Methods of providing non-porous controlled morphology hydroxyapatite granules in ammonium hydroxide are also provided. The hydroxyapatite granules and bulk materials formed by these methods are also provided.

11 Claims, 17 Drawing Sheets

OTHER PUBLICATIONS

Crosby et al., "Effects of drying conditions on the properties of spray-dried particles" *Chem. Eng. Prog.* (1958) 54(7):56–63.

Jarcho, "Calcium phosphate ceramics as hard tissue prosthetics" *Clin. Orthoped. Relat. Res.* (1981) 157:259–278.

Luo et al., "Synthesis of ultrafine hydroxyapatite particles by a spray dry method" *Mater. Sci. Eng.* (1995) C3:75–78.

Fowler, "Infrared studies of apatites. I. Vibrational assignments for calcium, strontium, and barium hydroxyapatites utilizing isotopic substitutions" *J. Inorg. Chem.* (1974) 13:194–207.

Charlesworth et al., "Evaporation from drops containing dissolved solids" *AIChEJ* (1960) 6(1):9–23.

Kirk et al., "The effect of the calcination process on the crystallite shape of sol-gel cerium oxide used for glass polishing" *J. Mater. Sci.* (1995) 30:2171–2175.

Konsztowicz et al., "The role of surface tension in the formation of donut-shaped granules during spray-drying" *E. Ceram. Trans.* (1990) 26:46–53.

Luo et al., "Preparing hydroxyapatite powders with controlled morphology" *Biomaterials* (1996) 17:1959–1963.

Luo et al., "Preparation of ultrafine (nanostructured) hydroxyapatite spherical particles using spray dry method" *Session S3: Mineralized Tissues*, Nov. 29, 9:45 AM S3.4, p. 597.

As-synthesized hydroxyapatite powder at 700°C for 1.5 hours 140 nm
- Agglomeration of nanoparticles Corresponding diffraction pattern

- Hexagonal crystalline structure

As-synthesized hydroxyapatite powder at 700°C for 1.5 hours 50 nm

Corresponding diffraction pattern

- Single crystal

METHODS OF SYNTHESIZING HYDROXYAPATITE POWDERS AND BULK MATERIALS

STATEMENT OF RIGHTS TO INVENTIONS MADE UNDER FEDERALLY SPONSORED RESEARCH

This work was performed under the auspices of the U.S. Department of Energy by Lawrence Livermore National Laboratory under contract No.-7405-Eng-48. The government may have certain rights in this invention.

TECHNICAL FIELD OF THE INVENTION

This invention relates to controlled morphology hydroxyapatite materials, and to methods of making and using them. In particular, the invention relates to methods of synthesizing hydroxyapatite solid spheres, hollow spheres or doughnut-shaped particles of less than 8 $\mu$m. The invention also relates to methods of making controlled morphology hydroxyapatite materials having homogenous cellular structures. Hydroxyapatite granules and bulk materials of controlled morphology and cellular structure are also provided.

BACKGROUND OF THE INVENTION

Hydroxyapatite [$Ca_{10}(PO_4)_6(OH)_2$] is a major mineral component in animal and human bodies, especially in "load-bearing" tissues such as bone and teeth. For example, in a typical wet cortical bone, which is composed of 22 wt % organic matrix, 69 wt % mineral, and 9 wt % water, the major subphase of the mineral component consists of sub-microscopic crystals of an apatite of calcium and phosphate, whose crystal structure resembles that of hydroxyapatite (HA). (Triffit, Chapter 3, FUNDAMENTAL AND CLINICAL BONE PHYSIOLOGY, ed. M. R. Urist (1980)). The apatite crystals are usually formed as slender needles, 20–40 nm in length and 1.5–7 nm in diameter. (Hohling et al. (1974) *Cell Tissue Res.* 148:11). The mineral phase is not a discrete aggregation of calcium phosphate mineral crystals per se. Rather, it is made of a continuous cellular structure which provides good mechanical strength. The apatite family of minerals, $A_{10}(BO_4)_6X_2$, crystallizes into a hexagonal rhombic prism. Hydroxyapatite, in particular, has the unit cell dimensions of a=0.9432–0.9418 nm and c=0.6881–0.6884 nm, and the maximum X-ray diffraction plane is (211). Posner et al. (1958) *Acta Crystallogr.* 11:308. The ideal Ca:P ratio of HA is 10:6 and the calculated density is 3.219 g $cm^{-3}$. (See, McConnell (1973) APATITE: ITS CRYSTAL CHEMISTRY, Springer-Verlag, Berlin).

Calcium phosphate-based biomaterials have been in use in medicine and dentistry for over 20 years because of their excellent biocompatibility with human tissues. Thus, hydroxyapatite has been widely used in dental implants, percutaneous devices, periodontal treatment, alveolar ridge augmentation, orthopedics, maxillofacial surgery, otolaryngology, and spinal surgery. (Hench (1991) *J. Am. Cer. Soc.* 74:1487).

In addition, hydroxyapatite has also been used as a biological chromatography support in protein purification and DNA isolation. (Tiselius et al. (1956) *Arch. Biochem. Biophys.* 65:132; U.S. Pat. No. 4,798,886). Hydroxyapatite is also currently used for fractionation and purification of a wide variety of biological molecules, such as subclasses of enzymes, antibody fragments, and nucleic acids. (See, e.g., Kadoya et al. (1988) *Liquid Chrom.* 11(14):2951; Cummings et al. (1995) Bio Rad Bulletin 1927 *US/EG REVA;* Kurtz et al. (1977) *PNAS* 74:4791). Crystalline hydroxyapatite columns are commonly used in high-performance liquid chromatography. Typically, the chromatographic column is filled with irregularly shaped hydroxyapatite gel having poor mechanical strength.

It is known that spherical powders, in general, have better rheological properties than irregular powders and, thus, produce better coatings for hip implants and chromatographic separation. (Liu et al. (1994) *J. Mater. Sci. Med.* 5:147). Spherical hydroxyapatite ceramic beads have recently been developed that exhibit improved mechanical properties and physical and chemical stability. However, these spherical ceramic beads are between 20–80 $\mu$m in size. (Cummings et al. (1995) *Bio Rad Bulletin* 1927 *US/EG REV A.*)

There are many advantages to reducing the granule size of spherical hydroxyapatite material. In general, the smaller the granule size, the higher the specific surface area and the higher the bonding capacity. U.S. Pat. No. 4,874,511 describes a column system for use in chromatography using a combination of hydroxyapatite particles having a diameter less than 1 $\mu$m and aggregated fine particles having diameters between 1 and 10 $\mu$m. Theoretically, the specific surface area (i.e., surface area per volume) is proportional to 6/d, where d is the diameter of the spherical granule. This relationship indicates that the specific surface area varies linearly with the reciprocal of the diameter of the granule. In addition, the mechanical properties of a packed column can be improved by reducing the granule size, resulting in more contacting surface area and greater frictional forces between granules. Furthermore, a uniform pack is expected to have a homogeneous pore distribution. However, very small crystals have been known to cause flow problems when used in chromatography.

Many of the published synthesis methods for HA are essentially chemical precipitation methods where controlled powder morphology and the nanocrystalline structure was not the primary concern. (Tanahashi et al. (1992) *J. Mater. Sci. Med.* 3:48; Li et al. (1993) *J. Ater. Sci. Med.* 4:127; Ybao et al. (1994) *J. Mater. Sci. Med.* 5:252). U.S. Pat. No. 4,335,086 to Spencer describes preparation of hydroxyapatite by heating an aqueous suspension of burshite to prepare rosette-shaped crystals. These crystals are between 40 and 70 $\mu$m in size.

U.S. Pat. No. 4,371,484 to Inukai et al. describes a process for making porous, sintered calcium phosphate particles. A foaming agent is added to a calcium phosphate slurry which is then dipped into a porous body of organic material and heated to form a porous network of hydroxyapatite.

The use of spray-dryers or atomizers to produce fine particles is known in the art. U.S. Pat. No. 5,435,822 to Blouin describes a method for applying plant fertilizer using spray-dried nutrient components. U.S. Pat. Nos. 5,108,956 and 5,205,928 to Inoue et al. describe processes for preparing sintered microspherical hydroxyapatite particles by spray-firing a suspension of hydroxyapatite dispersed in an inflammable solvent into a flame. These particles can also be constructed to have specific surface area, porosity and mechanical strength characteristics.

U.S. Pat. No. 5,082,566 to Tagaya et al. describes a calcium-phosphate type hydroxyapatite from 0.5 to 50 $\mu$m in diameter. The hydroxyapatite is formed by granulating an aqueous calcium-phosphate solution which is in the form of a gel or slurry by spray-drying the gel into a high-temperature air stream ranging from 100° C. to 200° C., thereby drying it instantaneously, and then subsequently firing the granular apatite at 400° C. to 700° C.

U.S. Pat. Nos. 5,039,408 and 5,441,635 to Ichitsuka et al. describe packing materials for chromatography columns. U.S. Pat. No. 5,039,408 describes fluoroapatite particles formed by firing fluoroapatite at between 900° C. and 1400° C. to obtain particles with pores of 0.01 to 20 μm. In U.S. Pat. No. 5,441,635, Ichitsuka et al. describe hydroxyapatite particles which are coated with a surface layer of fluoroapatite. The hydroxyapatite particles are between 2 and 100 μm and are formed by spray-drying a slurry of hydroxyapatite.

U.S. Pat. No. 5,158,756 to Ogawa et al. describes a method of producing spherical particles of calcium phosphate containing open pores which varied from 100 to 4000 Å. Over 90% of pores have a pore size which is 0.5 to 2 times larger than the average pore size. In this method, a hydroxyapatite slurry is stirred until it reaches a viscosity of 20 cP and is then spray-dried at a temperature ranging from 700° C. to 900° C.

None of the known methods that utilize spray-drying produce hydroxyapatite particles having controlled morphologies and/or having homogenous cellular structures.

The present invention provides novel methods of producing controlled morphology spherical hydroxyapatite granules ranging in size from 1 to 8 μm. Methods within the present invention involve the initial preparation of a hydroxyapatite slurry containing ammonium hydroxide followed by a spray-drying process, the controlling step, to produce granules having various structures. By adjusting the operating parameters (e.g., atomization pressure) and starting slurry (e.g., concentration), the methods of the subject invention can produce hollow or solid spheres and doughnut-shaped hydroxyapatite granules. The invention also provides methods of producing controlled morphology hydroxyapatite granules having homogenous cellular structures.

DISCLOSURE OF THE INVENTION

Figure 1:
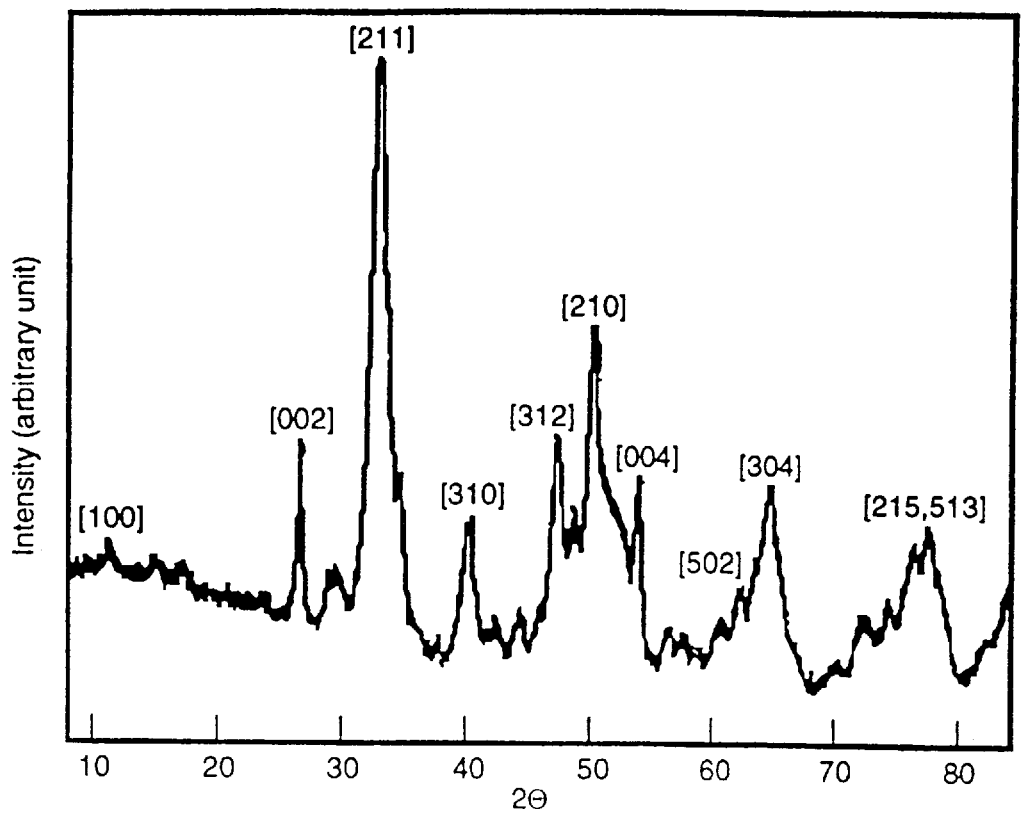
FIG. 1 is an X-ray diffraction pattern (XRD) of precipitated hydroxyapatite particles.

The present invention provides methods of synthesizing controlled morphology hydroxyapatite granules using a spray-drying process. The methods of the instant invention can be used to synthesize both porous and non-porous controlled morphology hydroxyapatite powders and bulk materials.

In one embodiment, the present invention provides a method for synthesizing non-porous hydroxyapatite materials of controlled morphology comprising the steps of (a) preparing a hydroxyapatite slurry; (b) adjusting the concentration and viscosity of the hydroxyapatite slurry to a concentration ranging from about 0 volume fraction to about 0.25 volume fraction and a viscosity ranging from about 0.5 cst to about 50 cst; (c) spray-drying the hydroxyapatite slurry to form granules using an atomization pressure ranging from about 1 kg/cm$^2$ to about 5 kg/cm$^2$, and optionally, employing a heated coaxial air flow; (d) heating the spray-dried granules to a temperature ranging from about 400° C. to about 500° C.; and (e) collecting the hydroxyapatite granules of step (d); wherein the concentration and viscosity of the hydroxyapatite slurry and the atomization pressure are varied to produce granules of particular controlled morphology.

In another embodiment, the method includes sintering the hydroxyapatite granules after spray-drying. In a particularly preferred embodiment, the optional sintering step is performed at a temperature ranging from about 700° C. to about 1100° C. for between about 10 minutes and about 1.5 hours.

In particularly preferred embodiments, the pH of the hydroxyapatite slurry is adjusted prior to spray-drying and the coaxial air flow is approximately 1.0 m$^3$ min$^{-1}$ and is heated to a temperature ranging from about 100° C. to about 200° C.

In another embodiment, the invention provides a method of producing controlled morphology hydroxyapatite granules having cellular structures comprising (a) adding an inorganic, water soluble calcium compound to a saturated solution of ammonium hydroxide at a pH greater than 11; (b) adding a phosphate-containing compound to the solution of step (a), wherein the phosphate compound is added until the ratio or calcium to phosphate ranges from about 1 to about 2 and a slurry of hydroxyapatite crystals is formed; (c) spray-drying the hydroxyapatite slurry containing saturated ammonium hydroxide of step (b) at a temperature ranging from about 25° C. to about 150° C. to form hydroxyapatite granules; (d) heating the spray-dried granules to a temperature ranging from about 400° C. to about 500° C. to remove residual ammonium hydroxide; and (e) sintering the granules at a temperature ranging from about 900° C. to about 1100° C.; wherein the temperature of the spray-drying in step (c) correlates to the size and number of cellular structures produced in the hydroxyapatite granules.

In particularly preferred embodiments, the cellular structure is characterized by interconnected channels and struts; the inorganic water-soluble calcium compound is calcium nitrate or calcium hydroxide; the phosphate containing compound is phosphoric acid or ammonium phosphate; the ratio of calcium to phosphate ranges from about 1.5 to about 1.7 and the phosphate-containing compound is added dropwise to the mixture of step (a).

In another aspect, the invention provides a method of producing nonporous, controlled morphology hydroxyapatite granules comprising (a) adding an inorganic, water-soluble calcium compound to a saturated solution of ammonium hydroxide at a pH greater than 11; (b) adding a phosphate-containing compound to the solution of step (a), wherein the phosphate compound is added until the ratio or calcium to phosphate ranges from about 1 to about 2 and a slurry of hydroxyapatite crystals is formed; (c) washing and centrifuging the slurry of step(b) to remove the saturated ammonium hydroxide; (d) adding water to the particles of step(c) to create a slurry of hydroxyapatite crystals; (e) spray-drying the hydroxyapatite slurry of step (d); (f) heating the spray-dried granules to a temperature ranging from about 400° C. to about 500° C. to remove residual water; and (g) sintering the granules at a temperature ranging from about 900° C. to about 1100° C.

In a particularly preferred embodiment, the spray-drying is performed at approximately 200° C.

In yet another aspect, the invention provides for hydroxyapatite granules produced according to the methods described herein. In a preferred embodiment, the homogeneous channels or pores are interconnected.

In another aspect, the invention provides for bulk hydroxyapatite materials having controlled morphology by cold pressing and sintering the hydroxyapatite granules prepared according to the methods described herein. In a particularly preferred embodiment, the granules are cold pressed at a pressure ranging from about 10 MegaPascals to about 300 MegaPascals and sintered at a temperature ranging from about 900° C. to about 1400° C.

In another embodiment, the invention provides for bulk hydroxyapatite materials having controlled morphology by hot pressing the hydroxyapatite granules prepared according to the methods described herein at a pressure ranging from about 10 MegaPascals to about 300 MegaPascals and a temperature ranging from about 900° C. to about 1400° C.

As will become apparent, preferred features and characteristics of one aspect of the invention are applicable to any other aspect of the invention.

MODES OF CARRYING OUT THE INVENTION

Throughout this application, various publications, patents and published patent applications are referred to by an identifying citation. The patents, publications and published patent specifications referenced in this application are hereby incorporated by reference into the present disclosure to more fully describe the state of the art to which the invention pertains.

As used herein, certain terms will be used that have defined meanings.

As used herein, "hydroxyapatite" means a chemical composition having the general formula $Ca_{10}(PO_2)_6(OH)_4$ as it is commonly known to those of skill in the art. Hydroxyapatite is a calcium-phosphate structure which forms a major component of mineralized structures of the human body. Hydroxyapatite is also useful as a tool for separating and isolating biomolecules such as proteins and nucleic acids. Currently, hydroxyapatite materials having a granule size above 20 $\mu$m are commercially available. (e.g., Sigma HA-Ultragel 60–180 $\mu$m).

As used herein, "controlled morphology" means a specific structure or shape which can be obtained by using specific reaction conditions. Those of skill in the art will understand that hydroxyapatite granules can exist in various shapes, for example, solid spheres, hollow spheres, doughnut shapes particles and the like.

As used herein, "slurry" means any semi-liquid aqueous mixture which may have insoluble matter within a liquid. As used herein, the "slurry concentration" is intended to mean the concentration of insoluble precipitate in the liquid. Thus, as used herein, a slurry concentration of "0 volume fraction" refers to a slurry where the hydroxyapatite is completely dissolved in the liquid (i.e. a solution). Similarly, a slurry concentration of having a concentration of about 0.25 volume fraction refers to a slurry which has approximately 25% insoluble matter therein. By adjusting the slurry concentration, hydroxyapatite granules of different sizes and shapes can be obtained.

As used herein, "viscosity" measures a material's resistance to change of form, for example, the resistance of a fluid or semifluid to flow. The property of viscosity, also referred to as internal friction, can be expressed in dyne-seconds per cm$^2$ (poises) or centipoises (cp). Kinematic viscosity is the ratio of viscosity to density. The unit of kinematic viscosity is the stoke (st) or centistoke (cst).

As used herein, "spray-drying" means the process of passing a liquid solution or slurry through a spray-nozzle and concurrently drying the liquid. Commercially available spray-drying machines are known to those of skill in the art, for example, Yamoto Scientific, New Jersey. The term "coaxial air flow" as used herein means a discharge of air which is in the same path as the spray-nozzle. Thus, the coaxial air flow can be used to dry the liquid being extruded from the spray nozzle. The coaxial air flow may also be heated.

As used herein, "granule" means any particulate form of a substance. The term includes, therefore, powders, grains, fragments, particles, dust or the like.

As used herein, "cellular structure" refers to the pores, channels and other structures which can be present in hydroxyapatite granules. The term "strut" refers to the cellular structure which occurs when the channels or pores of fine grains of hydroxyapatite are interconnected. The term "non-porous" means any materials which does not have a cellular structure, including pores, channels or strut. Examples of cellular structure and strut formations are described in detail in the Experimental section below and can be seen in the Figures.

As used herein, "an inorganic, water-soluble calcium compound" means any calcium compound which forms $Ca^{2+}$ ions when dissolved in a basic (above pH 11) solution. Examples of inorganic, water soluble calcium compounds include calcium nitrate, calcium hydroxide and the like. A "phosphate containing compound" includes any compound which forms a phosphate group under basic conditions. Examples include phosphoric acid or ammonium phosphate.

As used herein, "sinter" means fritting together of small particles to form larger particles, cakes or masses, usually under the influence of heat or pressure. Thus, temperature or pressure can be varied to produce one large cake or mass, or, more frequently, to aggregate small particles into multiple larger particles. As used herein, the term "sinter" is used interchangeably with the term "calcination."

Synthesis of Controlled Morphology Hydroxyapatite Granules

The invention provides methods of synthesizing non-porous, controlled morphology hydroxyapatite. While methods of making hydroxyapatite are known in the art, it is the surprising discovery of this inventor that spherical or doughnut-shaped hydroxyapatite granules of 8 μm or less could be routinely produced using the present invention. The synthesis methods of the present invention thus provide new forms of hydroxyapatite useful in bioimplants, in separation and isolation of biomolecules, such as proteins, peptides and single- and double-stranded DNA, and to purify water. The methods of the present invention essentially involve preparing a hydroxyapatite slurry of known concentration and viscosity followed by spray-drying the slurry under specific atomization pressure and flow rate to produce a ultrafine hydroxyapatite powder. Optionally, the hydroxyapatite powder can be sintered to produce larger particles.

Preparation of Hydroxyapatite Solution

A solution of hydroxyapatite is prepared by methods known in the art. In a preferred embodiment, the solution is prepared with calcium nitrate and ammonium hydrophosphate wherein the ratio of calcium to phosphate is about 10:6. The components are thoroughly mixed. Preferably, the calcium nitrate and ammonium hydrophosphate are water soluble. Calcium nitrate and ammonium hydrophosphate are available from commercial sources, for example, JT Baker.

In a preferred embodiment, the pH of the calcium-phosphate solution is adjusted to approximately 2.0 using dilute acid or to approximately 10.0 using dilute base. Although the type of acid or base using to adjust the pH is not believed to be critical, $HNO_3$ and aqueous ammonium nitrate are preferred. The hydroxyapatite solution may then be subjected to spray-drying as described below, or alternatively, washed and collected prior to spray-drying.

The hydroxyapatite granules may be collected in any suitable manner. For example, in a preferred embodiment, the precipitate is washed at least eight times with distilled water and centrifuged for about 10 to about 20 minutes at about 9,000 to about 10,000 rpm to sediment the precipitate between washing steps. Other methods of collecting the granules include, but are not limited to, filtering, evaporation, or the like.

A slurry is then formed by adding liquid to the precipitated granules. Thus, the density of the slurry can be determined and adjusted by adding specific amounts of liquid. In a preferred embodiment, the slurry is made using distilled water. The precipitated granules are thoroughly mixed into the liquid, for example, by ultrasonic dispersion.

Preparation of a Spray-Dried Hydroxyapatite Powder

A hydroxyapatite powder is then formed by spray-drying the hydroxyapatite slurry solution through a spray-nozzle under atomization pressure. The concentration and viscosity of the slurry may be adjusted prior to spray-drying. Preferably, the slurry concentration ranges from about 0 to about 0.25 volume fraction and the viscosity ranges from about 0.5 cst to about 50 cst. Spray-drying of slurries and solutions is well known to those of skill in the art. (See, Masters 1979) *Spray Drying Handbook,* George Godwin Ltd; Crosby et al. (1958) *Chem. Eng. Prog.* 49(9):480–486).

Suitable spray-dryers are commercially available from, for example, Yamoto Scientific, N.J.

The slurry is extruded from a spray-nozzle under pressure. As is known in the art, the size of the apertures in the spray-nozzle can be varied to control the morphology. For example, Yamoto Scientific provides nozzles having five different size apertures which all may be used in the practice of this invention. The pressure may also be varied. In a preferred embodiment, the pressure ranges from about 1 to about 5 kg/cm².

Preferably, the atomization liquid is rapidly dried by a coaxial flow of heated air. In most commercially available spray-dryers, a method of introducing coaxial air flow is provided. Other suitable methods of providing a coaxial air flow will be known to those of skill in the art. In a preferred embodiment, the coaxial flow rate has a flow rate of approximately 1.0 m³ min⁻¹. Optionally, the coaxial air can also be heated, preferably to temperatures up to approximately 200° C., more preferably to temperatures up to approximately 100° C.

The resultant, spray-dried hydroxyapatite powder may be separated from the flowing air stream, for example by cyclone-separation, collected and used as a spray-dried granules. Alternatively, the powder may be sintered as described below.

The spray-dried granules are typically either spheres or doughnut shapes. Spheres are either hollow or solid. The size and shape of the granule is a function of the slurry concentration, atomization pressure and slurry viscosity. Thus, in one embodiment a slurry concentration of about 0.25 volume fraction produces solid spheres having a mean size of about 7.8 μm at approximately 1 kg/cm² of pressure, approximately 1.5 μm at 3 kg/cm² and approximately 1.4 μm at 5 kg/cm².

In another preferred embodiment, hollow spherical hydroxyapatite granules are synthesized by using a slurry concentration of 0 volume fraction (i.e. complete dissolution) and an atomization pressure of about 3 kg/cm². The hollow spheres have a mean size of 3.8 μm. In yet another preferred embodiment, doughnut-shaped hydroxyapatite granules are produced by using a slurry concentration of approximately 0.167 volume fraction and an atomization pressure of approximately 3 kg/cm². The average size of the doughnut-shaped granules was approximately 1.7 μm.

Sintering the Hydroxyapatite Granules

The hydroxyapatite powder described above can also be treated to form larger particles, for example, by sintering (or calcination). Temperature ranges for sintering hydroxyapatite are known in the art. Jarco (1981) *Clin. Orthoped. Relat. Res.* 157:259. In one embodiment the spray-dried hydroxyapatite powder is placed in an alumina boat in a furnace preheated to a given temperature. Preferably, the temperature of the furnace ranges from about 700° C. to about 1100° C., and the powder is sintered for about 10 minutes to about 2 hours. Sintering at approximately 700° C. for about 1.5 hours results in an average particle size of about 8 μm. Notably, the particles also have a homogenous calcium-phosphate ratio. Thus, although thermal exposure at about 1000° C. to about 1100° C. causes some decomposition of hydroxyapatite, the average size of the granules is still well below 60 nm.

Preparation of Controlled Morphology Hydroxyapatite with Cellular Structure

The present invention also provides methods of synthesizing hydroxyapatite granules having homogenous cellular structures. A slurry of hydroxyapatite is prepared by dissolving calcium hydroxide or calcium nitrate in a saturated ammonium hydroxide solution. The ammonium hydroxide solution is pH 11 or greater. Phosphoric acid or ammonium phosphate is then added to this solution, preferably in a dropwise manner to produce a calcium-phosphate ratio of approximately 1.5 to 1.7.

Spray drying of the hydroxyapatite slurry is conducted essentially as described above. Since the concentration of ammonium hydroxide determines the size and number of the cellular structures (e.g. pores or channels), the conditions of spray-drying can be varied to increase or decrease the amount of ammonium hydroxide which is left in suspension. In general, the higher the temperature of spray-drying, the more ammonium hydroxide is vaporized and, consequently, HA particles with fewer and smaller cellular structures will be formed. Alternatively, a lower temperature keeps more ammonium hydroxide in suspension, which will, in turn, result in more and larger pores or channels. Thus, in one embodiment, the spray drying is conducted at room temperature. In other embodiments, the spray drying is conducted at temperatures ranging from approximately 50° C. to approximately 150° C.

Residual ammonium hydroxide can be removed from the spray-dried granules by heating. Preferably, the spray-dried granules are heated to a temperature ranging from about 400° C. to about 500° C., which causes the ammonium hydroxide to vaporize or decompose. This heating step also creates interconnections between the channels of the HA particles cellular structure. It is critical that the residual ammonium hydroxide be removed before sintering, as the high temperature sintering causes ammonium hydroxide to burst which would destroy the morphology and cellular structure of the HA granules.

Sintering of the spray-dried granules can be performed essentially as described above. Preferably, the particles are sintered in a furnace in the temperature range of about 900° C. to about 1100° C. The sintering step allows for the formation of struts between the HA granules.

Preparation of Non-Porous Controlled Morphology Hydroxyapatite In Ammonium Hydroxide The invention also provides methods of synthesizing controlled morphology, non-porous hydroxyapatite granules. In one embodiment, a hydroxyapatite slurry is prepared in a basic, saturated ammonium hydroxide solution as described in the preceding section. Washing, as by centrifugation, of the slurry is conducted as described above to remove the ammonium hydroxide. Spray-drying is then conducted as described above. In a preferred embodiment, the temperature of the spray-drying step is approximately 200° C. The hydroxyapatite granules formed by spray-drying are spherical and essentially non-porous. The non-porous granules are then heated to about 400° C. to about 500° C. to remove residual water. Sintering of the particles can be performed as described above.

Preparation of Bulk Hydroxyapatite Materials

Both the non-porous and porous controlled morphology hydroxyapatite granules described above can be processed to form bulk materials. As is known to those of skill in the art, bulk materials can readily be prepared from powders. In one aspect, bulk materials can be made using a cold press step followed by sintering step. Cold pressing is performed at a pressure ranging from about 10 MegaPascals to about 300 MegaPascals. Sintering is performed at a temperature ranging from about 900° C. to about 1400° C. Alternatively, bulk hydroxyapatite materials can be formed by hot press processes at a pressure ranging from about 10 MegaPascals to about 300 MegaPascals and a temperature ranging from about 900° C. to about 1400° C.

Use of the Controlled Morphology Hydroxyapatite Granules

The spheres and doughnuts made by the methods of the present invention are useful in a variety of applications. Regular shaped, small granules have increased mechanical strength and chemical stability and are ideal column matrices for chromatography applications. The HA granules can be used for protein and peptide purification and for single or double stranded nucleic acid isolations, including DNA or RNA. The spherical granules with cellular structure have high binding capacities and are useful in concentrating proteins and nucleic acids.

Another application of the controlled morphology HA particles described herein is as a matrix for purifying water. The water to be purified can be passed through the particles which remove unwanted proteins, chemicals, and the like.

The hydroxyapatite particles described herein are also useful as precursors for processing bio-implant materials, for example, for human bones and teeth.

EXAMPLES

Example 1

Preparation of controlled morphology hydroxyapatite spheres

The synthesis procedure of the present invention consists primarily of three steps: (1) solution preparation, (2) precursor synthesis, and, optionally, (3) thermal treatment. In step (1), a solution was made of water-soluble compounds containing constituent elements in HA, i e., calcium nitrate and ammonium hydrophosphate. Ca:P is in the ratio 10:6. The solution was mixed thoroughly in a flask with a magnetic stirrer. Dilute acid ($HNO_3$) and basic aqueous ammonium nitrate ($NH_4OH$) solutions were added to the mixture (without changing the concentrations of the constituent elements) to adjust its pH value to 2.0 or to 10.0. Luo et al. (1995) *Mater. Sci. Eng.* 75:78. The resulting precipitates were washed eight times with distilled water using a centrifuge until the acid or base was completely removed. The precipitated hydroxyapatite granules were further dispersed ultrasonically in distilled water.

In step (2), drying of the slurry mixture was carried out with a spray dryer. The slurry samples were extracted from a feed tank and passed through the spray nozzle. Compressed air with a selected pressure was used during spraying (atomization). Atomization was carried out at pressures of 1, 3, and 5 kg cm$^{-2}$. The atomized liquid drops were dried rapidly by a coaxial flow of air (flow rate of 1 m$^3$ min$^{-1}$) that was preheated to a temperature of 100° C. The resulting spray-dried precursor powder, was cyclone-separated from the flowing air stream and collected in the product vessel.

In step (3), the precursor powder mixture was calcinated (sintered) to form nanocrystalline HA. Calcination was performed by placing the precursor powder mixture in an alumina boat in a furnace preheated to a given temperature. All experiments were conducted in air.

The characterization of powders produced using different experimental parameters, i.e., temperature and time, was conducted by X-ray diffraction (XRD), Fourier transform infrared spectroscopy (FTIR), scanning electron microscopy (SEM), and transmission electron microscopy (TEM). X-ray diffractometry was used to determine the crystallographic lattice spacing and structure. A monochromatic copper K$_1$ radiation (wavelength=1.54 Å) was selected. The operational tube voltage and current were 40 kV and 120 mA, respectively. Diffraction patterns and corresponding intensities were compared with data from ASTM standards. Crystalline phases present in the sintered powder were identified and the average grain sizes were calculated by the line broadening method. In the case of FTIR analysis, samples were prepared by pressing small amount of sintered HA into standard KBr powders. The chemical nature and molecular bond structure of the synthesized HA were determined from the measured FTIR. The morphology and size distribution of the synthesized HA were investigated using SEM. In addition, energy dispersive X-ray analysis (EDAX) was used to examine the compositional uniformity of the specimen. Due to the fineness of the nanograins, TEM was also employed to examine the microstructure. Sample preparation was carried out initially by breaking down the agglomerated powder into nanograins using an ultrasonic bath and then collecting them on a copper grid coated with carbon film. Bright field imaging provides information on the morphology of the nanograins (shape and size) and the corresponding diffraction pattern indicates the crystalline structure.

Analysis of the Precipitated particles

Figure 2:
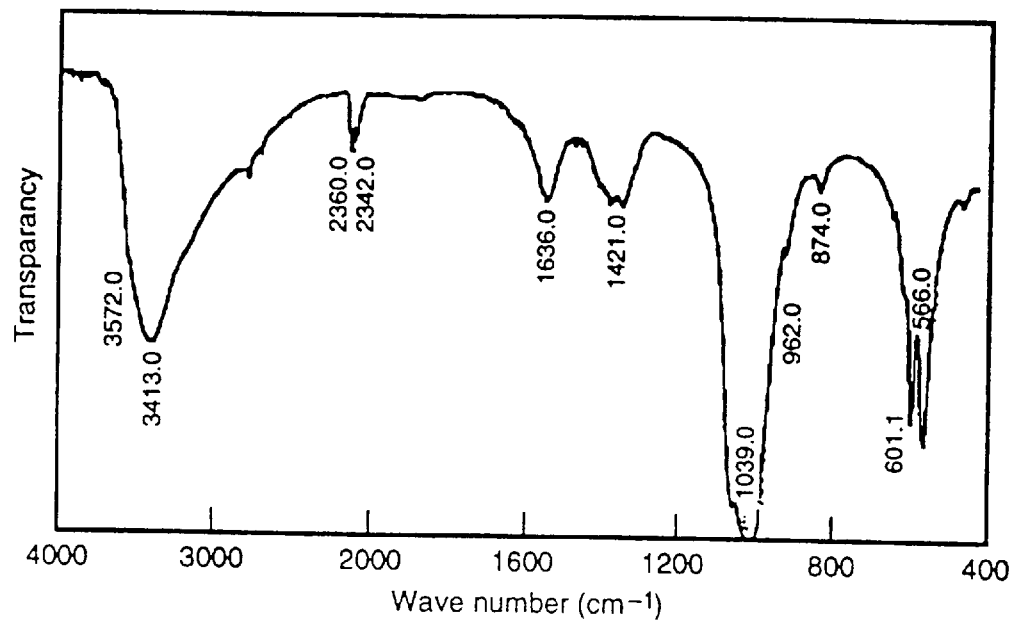
FIG. 2 depicts Fourier transform infrared spectrometry (FTIR) of precipitated hydroxyapatite particles.

The precipitated hydroxyapatite particles were nanocrystalline. The crystallinity of hydroxyapatite particles is revealed clearly by XRD patterns shown in FIG. 1; diffraction planes with high intensities are labeled in this figure. X-ray analysis indicated that the sintered particles did not contain any discernible crystalline impurity. The average crystallite size, determined from X-ray line-broadening analysis as described in Cullity (1978) *ELEMENTS OF X-RAY DIFFRACTION,* Addison-Weslely Publishing, was about 10 nm. FIG. 2 shows the corresponding bonding analysis of the precipitated particles. This FTIR spectrum is consistent with the data from hydroxyapatite synthesized using other methods. Liu et al. (1994) *J. Material Sci. Mater. Med.* 5:147. Most of the peaks are attributed to two vibration modes: (1) the stretching mode of (PO$_4$)$^{3-}$ occurring at 566, 604, 962, and 1039 cm$^{-1}$; and (2) the stretching mode of OH$^-$ occurring at about 3572 cm$^{-1}$, shown as a small shoulder of the large H—O—H (3431 cm$^{-1}$) peak. Fowler (1974) *J. Inorg. Chem.* 13:194. Another H—O—H peak was also observed at 1636 cm$^{-1}$, and a small amount of (CO$_3$)$^{3-}$ was recorded at 874 and 1421 cm$^{-1}$.

Figure 3:
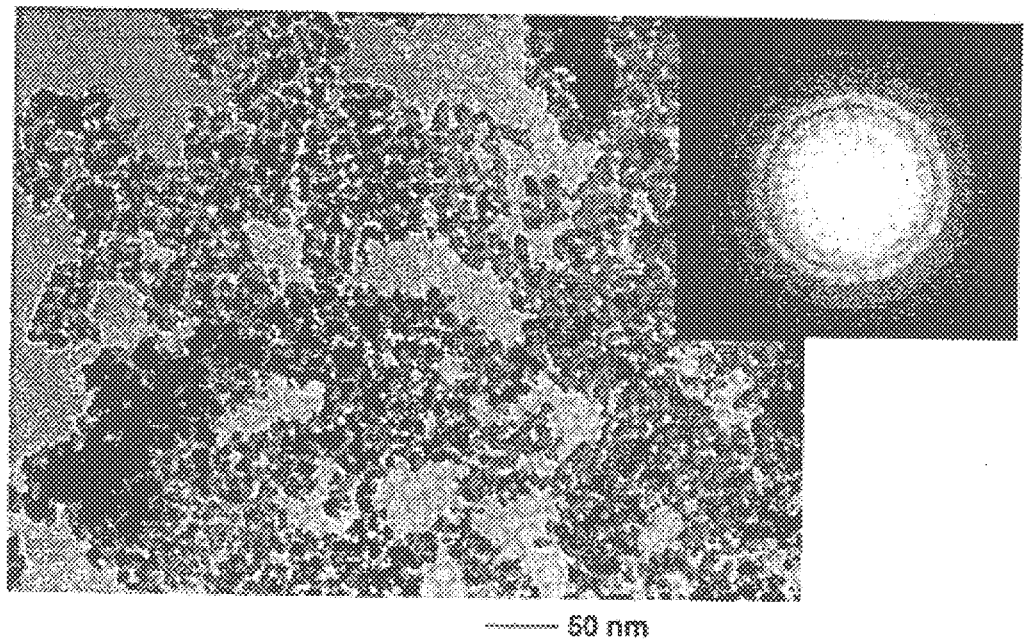
FIG. 3 is a reproduction of a transmission electron micrograph (TEM) in bright-field showing the precipitated hydroxyapatite particles.

The fineness of precipitated hydroxyapatite particles was also directly revealed by TEM (FIG. 3). The crystalline size was about 10 nM, which is in good agreement with that measured from X-ray line-broadening analysis. The corresponding diffraction pattern (FIG. 3, inset) exhibits diffused rings, indicating that the particles were nanocrystalline without preferred orientation.

Analysis of Spray-dried granules

Crystalline structure

Figure 4:
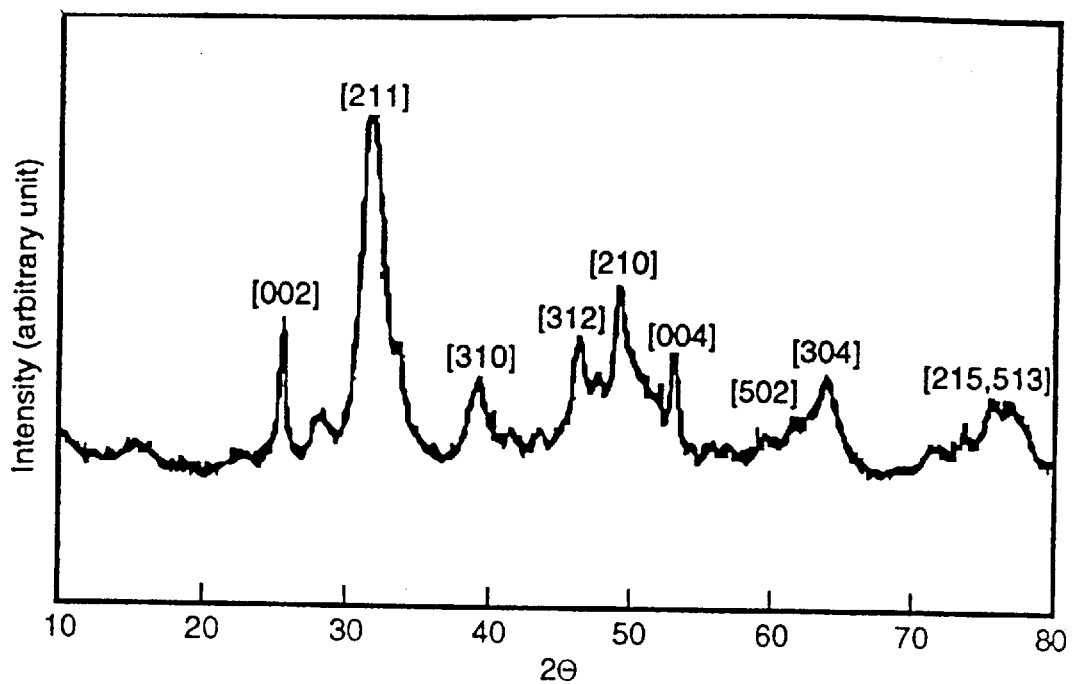
FIG. 4 is an X-ray diffraction pattern of spray-dried hydroxyapatite granules.

The spray-dried particles (granules) were agglomerated. FIG. 4 shows the XRD pattern from these agglomerated hydroxyapatite granule. Comparing FIG. 4 with FIG. 1, we noted no significant changes in either crystalline structure or phase impurity, even though these granules were prepared at 200° C. FTIR analysis from the spray-dried granules was also similar to that from the precipitated particles. Apparently, the presently used spray process (at 100°–200° C.) neither changes the structure of hydroxyapatite nor causes any grain coarsening.

Morphology and size distribution

Figure 5:
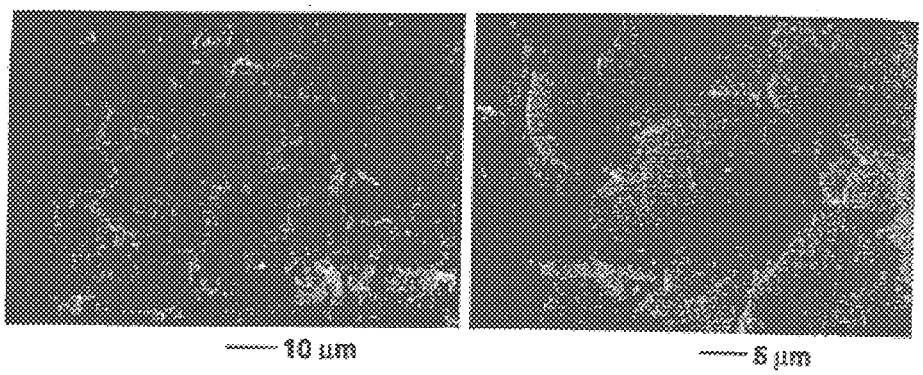
FIG. 5, panels (A) to (F), are reproductions of transmission electron micrographs of spray-dried hydroxyapatite granules. Panels (A) and (B) show solid sphere particles at an atomization pressure of 1 kg cm$^2$ and a slurry concentration of 0.25 volume fraction. Panels (C) and (D) show solid sphere particles at an atomization pressure of 3 kg cm$^{-2}$ and a slurry concentration of 0.25 volume fraction. Panels (E) and (F) show solid sphere particles at an atomization pressure of 5 kg cm$^{-2}$ and a slurry concentration of 0.25 volume fraction.
Figure 5:
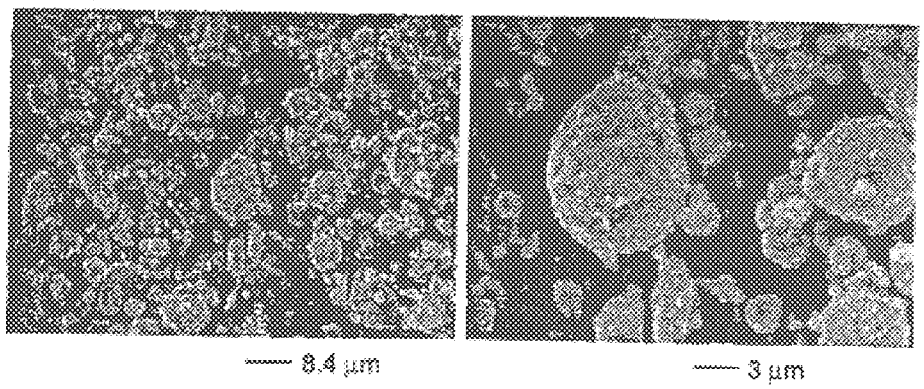
Figure 5:
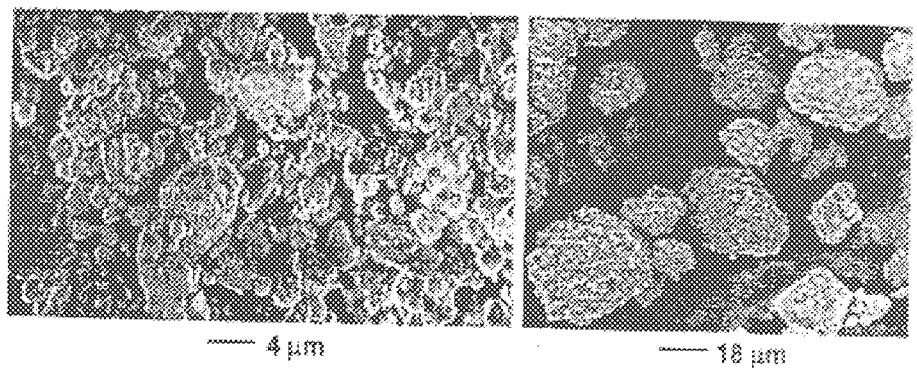
Figure 6:
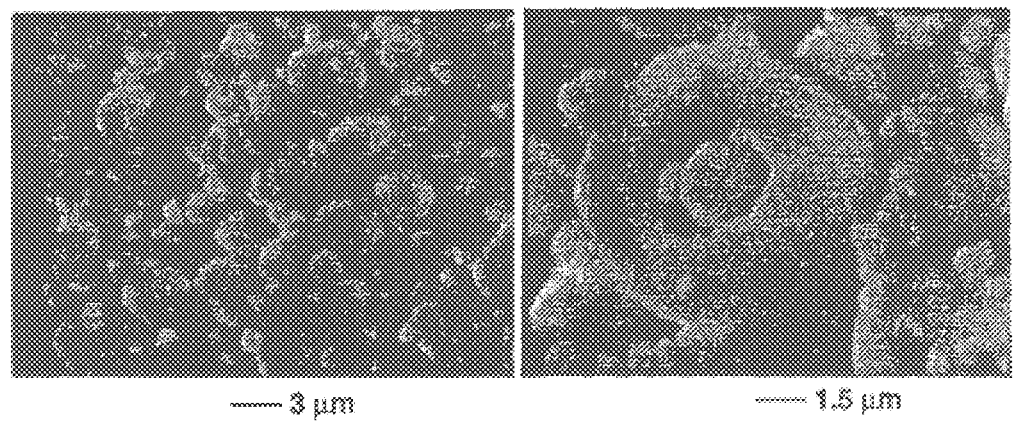
FIG. 6, panels are reproductions of transmission electron micrographs of spray-dried hydroxyapatite granules. Panels show doughnut particles at an atomization pressure of 3 kg cm$^{-2}$ and a slurry concentration of 0.167 volume fraction.
Figure 7:
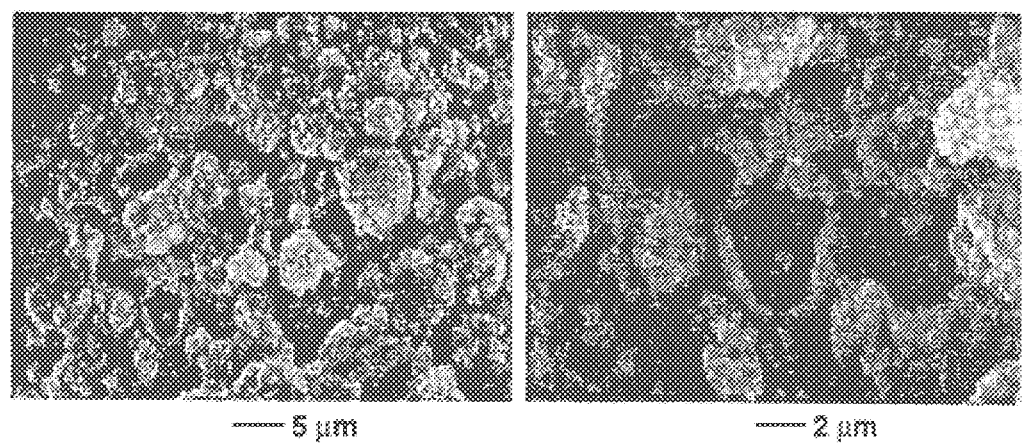
FIG. 7, panels are reproductions of transmission electron micrographs of spray-dried hydroxyapatite granules. Panels show solid sphere particles at an atomization pressure of 3 kg cm$^{-2}$ and a slurry concentration of 0.00 volume fraction (i.e. solution).

The morphology, size, and size distribution of spray-dried granules varied with the spray conditions. FIGS. 5, 6 and 7 show scanning electron micrographs of granules produced under different processing conditions. The overall morphology is revealed in the left-hand figures, and the detailed morphology is shown in the right-hand figures. According to their shapes, two types of hydroxyapatite granule (spherical and doughnut) were produced. For spheres, granules can be further categorized into solid or hollow forms. In our study, solid spheres, hollow spheres, and doughnut shapes were produced at slurry concentrations of 0.25, 0 and 0.167, respectively. The mean size and size distribution of these granules are presented in Table 1 and plotted in FIG. 8.

TABLE 1

Average size versus spray-drying parameter

| Structure | P (kg cm$^{-2}$) | p (vol %) | η (cst) | Mean (μm) | Median (μm) |
|---|---|---|---|---|---|
| Solid | 1 | 0.25 | 2.1 | 7.8 | 6.6 |
| Solid | 3 | 0.25 | 2.1 | 1.5 | 1.2 |
| Solid | 5 | 0.25 | 1.8 | 1.4 | 1.3 |
| Donut | 3 | 0.167 | 2.04 | 1.7 | 1.5 |
| Hollow | 3 | 0.00 | 0.7 | 3.8 | 3.5 |

Figure 8:
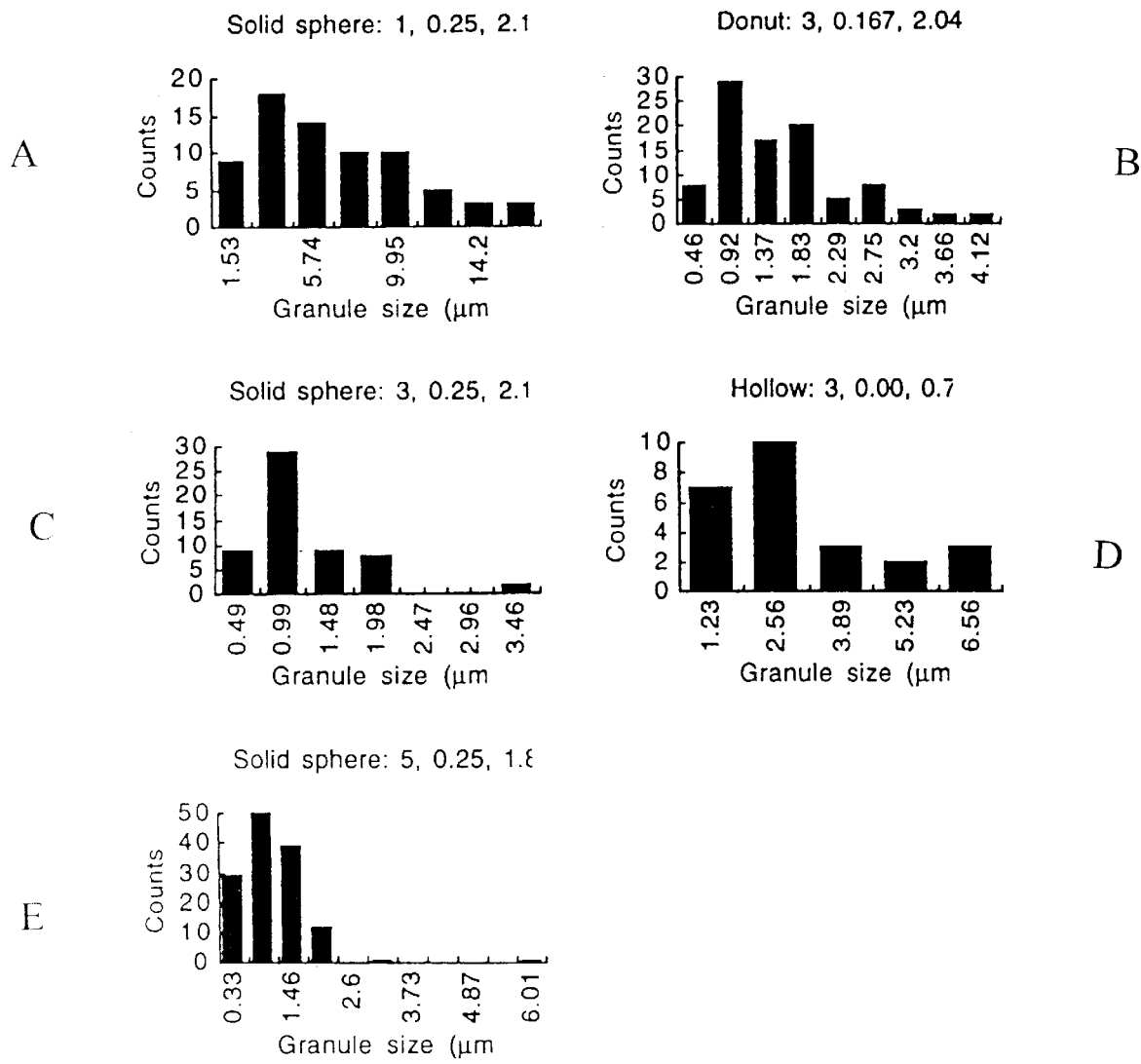
FIG. 8, panel (A) to (E) are histogram analyses of granule size distribution of the hydroxyapatite particles. Panel (A) shows solid spheres at an atomization pressure of 1 kg cm$^{-2}$, a slurry concentration of 0.25 volume fraction and a viscosity of 2.1. Panel (B) shows doughnut spheres at an atomization pressure of 3 kg cm$^{-2}$, a slurry concentration of 0.00 volume fraction and a viscosity of 2.04. Panel (C) shows solid spheres at an atomization pressure of 3 kg cm$^{-2}$, a slurry concentration of 0.25 volume fraction and a viscosity of 2.1. Panel (D) shows hollow spheres at an atomization pressure of 3 kg cm$^{-2}$, a slurry concentration of 0.00 volume fraction and a viscosity of 0.7. Panel (E) shows solid spheres at an atomization pressure of 5 kg cm$^{-2}$, a slurry concentration of 0.25 volume fraction and a viscosity of 1.8.

P: Atomization pressure; kg cm$^{-2}$
p: Liquid density; vol %
η: Liquid viscosity, cst As indicated in Table 1, the size of solid spheres, produced at a slurry concentration of 0.25 volume fraction, depended upon the atomization pressure. Specifically, the mean values were 7.8, 1.5, and 1.4 μm at the applied atomization pressures of 1, 3 and 5 kg cm$^{-2}$, respectively. This indicates that atomization pressure has a strong influence on the average granule size. FIG. 8 also indicates a narrower particle size distribution at a higher atomization pressure. For example, granules ranged from 0.33 to 2.03 μm at a pressure of 5 kg cm$^{-2}$, but ranged from 1.5 to 16.3 μm at a pressure of 1 kg cm$^{-2}$.

Doughnut-shaped granules (produced at a slurry concentration of 0.167) were obtained at an atomization pressure of 3 kg cm. The granule sizes ranged from 0.5 to 3 μm, which is similar to that of solid spheres prepared under the same atomization pressure (3 kg cm$^{-2}$). The average size of the doughnut-shaped granules was approximately 1.7 μm.

For hollow spheres, the average size was approximately 3.8 μm. The granule size distribution was noted to be broader (up to 6 μm) than those of solid spheres and doughnut shapes. It should be pointed out, however, that it was difficult to accurately assess the size of hollow spheres, because they often fractured during spray drying.

Despite the differences in size distribution, we noted that the size distribution function for all spray-dried hydroxyapatite granules followed the log normal-type distribution; i.e., a linear relationship existed between the logarithm of the particle size and the cumulative percentage of the counts.

Figure 9:
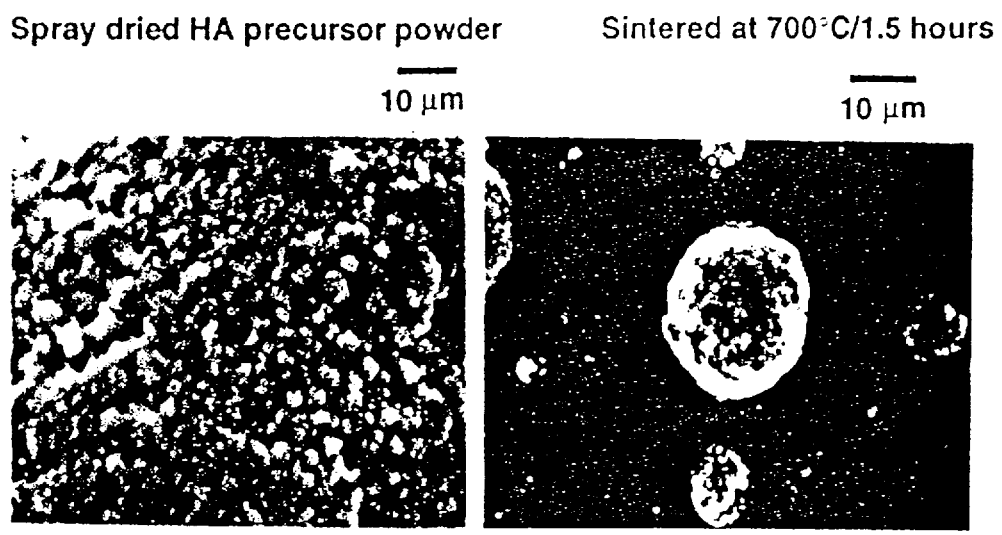
FIG. 9, panels are scanning electron micrographs of spray-dried hydroxyapatite power and sintered hydroxyapatite powder.
Figure 10:
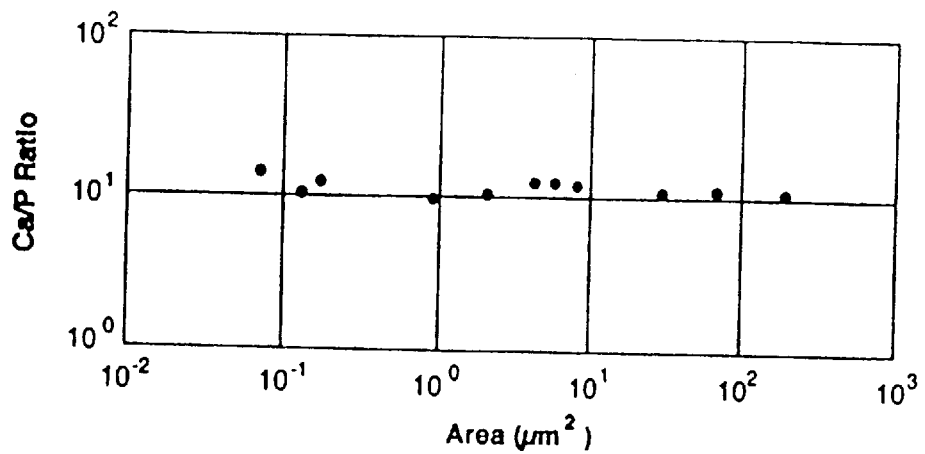
FIG. 10 is an EDAX analysis illustrating the chemical homogeneity of the sintered hydroxyapatite granules.

Scanning electron micrographs of the precursor powder and sintered powder are shown in FIG. 9. The spray dried precursor powders are about 2 $\mu$m in size. Most of them are agglomerated into spherical particles. They have a rough surface morphology. High temperature calcination causes the powders to slightly sinter and coarsen. This is due to the liquid phase formation and the vaporization of by-products such as ammonium nitrate. Calcination at 700° C. for 1.5 hours results in an average particle size of about 8 $\mu$m, as shown in FIG. 3, panel (B). Although it is not evident in the figure, the particles are essentially hollow shells. Close examination indicates that the surface of these particles consists of many ultrafine particulates. To evaluate the chemical homogeneity, an EDAX analysis (FIG. 10) was performed on the sintered (700° C. for 1.5 hours) HA powders. In FIG. 10, the relative concentration ratio of Ca:P (corresponding to the intensity ratio) is plotted as a function of the probe area. Although there may be a slight localized (~0.1 $\mu$m) variation, the Ca:P ratio is noted to be essentially a constant up to a probe area of 200 $\mu m^2$. This indicates that sintered calcium phosphate is quite homogenous.

Figure 11:
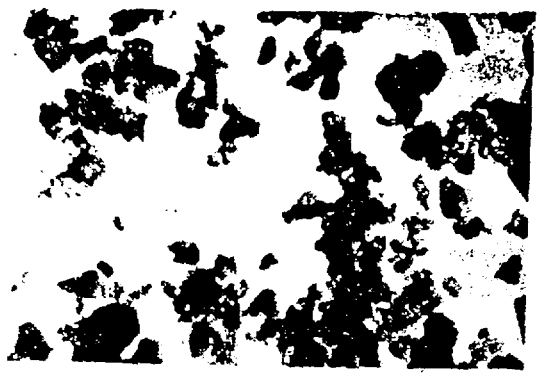
FIG. 11, panels are transmission electron micrographs of hydroxyapatite granules sintered at 700° C. for 1.5 hours and the corresponding diffraction pattern.
Figure 11:
Figure 12:
FIG. 12, panels are transmission electron micrographs of a rod-shaped hydroxyapatite granule sintered at 700° C. for 1.5 hours and the corresponding diffraction pattern.
Figure 12:
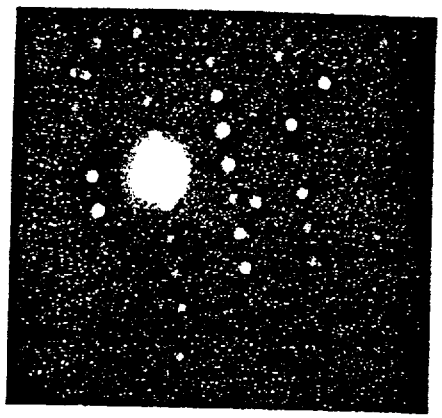

The microstructure of the sintered powder was further examined using TEM. Shown in FIG. 11 is a TEM micrograph with the corresponding diffraction pattern from powder synthesized at 700° C. for 1.5 hours. The powders are nanometer sized and most of them are rod shaped. The corresponding diffraction pattern indicates the sintered powder is polycrystalline with preferred orientations. Shown in FIG. 12 is a rod-shaped particle (50 nm in lateral dimension). The corresponding diffraction pattern suggests that the particle is a single crystal (hexagonal) with a <2110> zone axis.

Bond structure and crystalline structure

Figure 13:
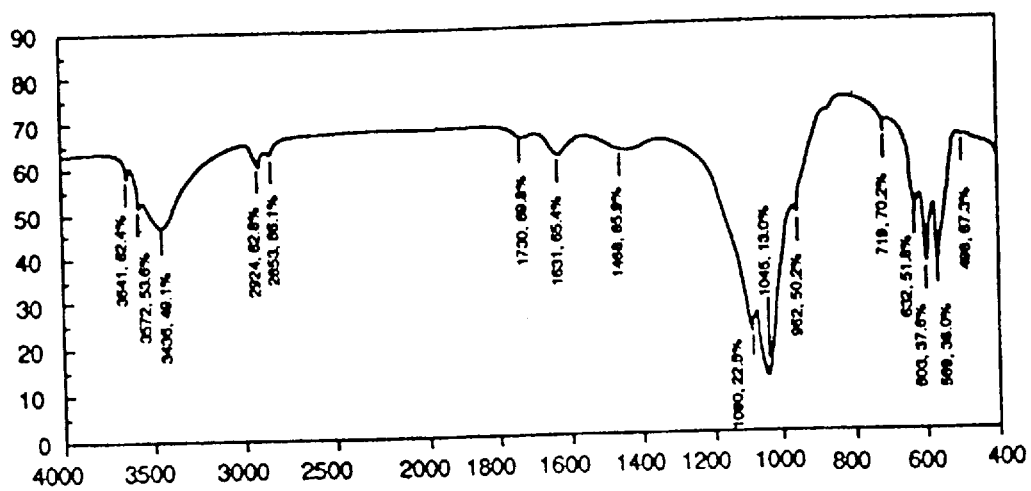
FIG. 13 is an FTIR analysis of hydroxyapatite powder sintered at 700° C. for 1.5 hours showing particle size distribution.
Figure 14:
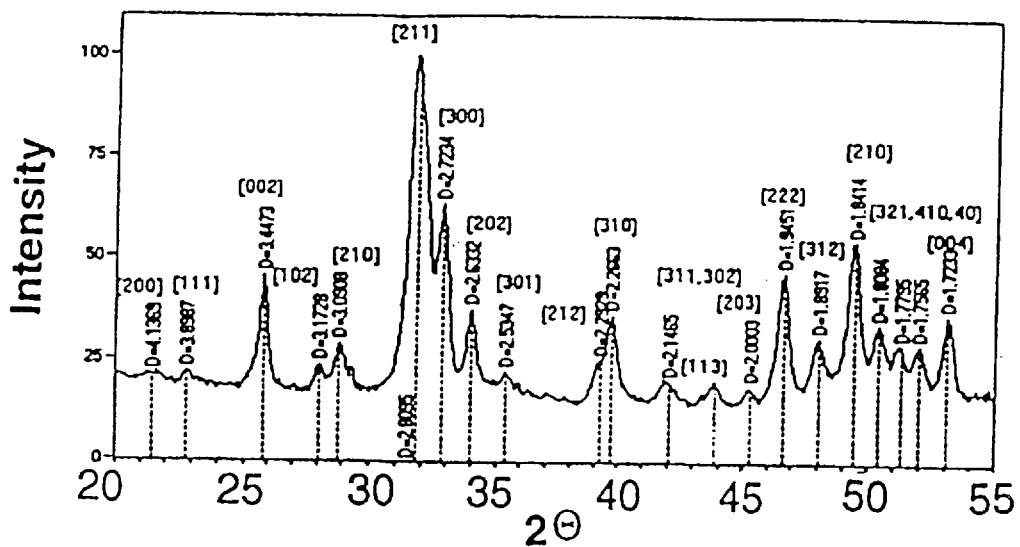
FIG. 14 is a diffraction spectrum of hydroxyapatite powder sintered at 700° C. for 1.5 hours.

The FTIR analysis of the powder synthesized at 700° C. for 1.5 hours is shown in FIG. 13. This spectrum is consistent with that observed from hydroxyapatite synthesized by different methods. Most of the peaks are attributed to two kinds of vibration mode (see, Fowler (1974) *J. Inorg. Chem.*, 13:194): three $(PO_4)^{-3}$ stretching modes occurring at 962, 1045, and 1090 $cm^{-1}$, and two $(PO_4)^{-3}$ bending modes at 569 and 603 $cm^{-1}$. The stretching modes of OH— occur at about 3572 and 3641 $cm^{-1}$, where the powder exhibit relatively sharp absorption peaks. The flexural mode of OH— at 632 $cm^{-1}$ is also observed. In addition, a small amount of $(CO_3)^{-3}$ is recorded at 1400 to 1460 $cm^{-1}$, but the intensities of these peaks are relatively low. Shown in FIG. 14 is the diffraction spectrum of the sintered HA heat treated at 700° C. for 1.5 h. The diffraction peak with maximum intensity is (211). The lattic parameter are calculated to be a=0.9410 nm and c=0.6842 nm. These values are noted to be slightly different from those reported previously. According to the literature, the lattice parameters are a=0.9432–0.9418 nm and c=0.6881–0.6884 $\mu$m. Also pointed out in FIG. 14 is the absence of other phase modifications of calcium phosphates.

Relationship between granule size and spray-drying condition

During spray drying, liquid was dispersed into droplets by pressurized gas. In general, the droplet size D can be expressed by an empirical equation:

$$D \propto P^{-n} M^1 \eta^r \sigma s\, p^{-t}, \qquad (1)$$

where P is the atomization pressure, M is the liquid flow rate, $\eta$ is the viscosity, $\sigma$ is the surface tension (energy), p is the concentration of slurry, and n, q. r s, and t are constants whose values depend upon operating conditions. (See, Masters (1979) *Spray Drying Handbook*, George Godwin Ltd).

For this discussion, it was assumed that (1) the granule size is proportional to the droplet size; (2) the influence of surface tension can be neglected (a small s value is often found), and (3) the liquid flow rate during spray drying remains constant. Equation 1 can then be expressed as $$D_{mean} = C P^{-n}\, \eta^r\, p^{-t} \qquad (2)$$

where $D_{mean}$ is the average granular size ($\mu$m); C is a constant [$\mu$m·(kg $cm^{-2}$)$^n$·(cst)$^{-r}$·(vol %)$^t$] corresponding to the units for P (kg $cm^{-2}$), $\eta$ (cst), and p (vol %). We used a non-linear regression method to define the parameters C, n, r, and t of Equation 2. Seven groups of data ($D_{mean}$, P, $\eta$, and p) were used to define the four parameters (Table 2). A non-linear regression was performed by selecting a criteria of the least sum, which means that the calculation continues until $\Sigma_{i=1}^{7}$ $(D-D_1)^2$ reaches the minimum. Using this method, four constants (C, n, r, and t) were determined and are included in Table 2. Equation 2 can now be rewritten as $$D_{mean} = 1.23 P^{-0.17}\, \eta^{0.07}\, p^{-0.39} \qquad (3)$$

Using Equation 3, the particle size can be calculated and is also listed in Table 2. It is noted in the table that $D_{cal}$ is comparable with the experimental value ($D_{exp}$). The accuracy $\Sigma (D_{cal}-D_{exp})^2$ equals 1.759; thus, the absolute accuracy $|D_{cal}-D_{exp}|$ equals 0.5 $\mu$m.

As shown in Table 2, the three power indices are n≅0.2, r≅0.1, and t≅0.4. The literature-reported values for these indices are n≅0.3[9], r≅0.2[10] and t≅0.33[10]. The n and r values were slightly different from the literature values, but the t value was noted to be quite close to the reported value. It is evident in Equation 3 that viscosity played only a minor role in determining the final granule size. Also, Equation 3 can be used to predict the granule size of spray-dried hydroxyapatite under various operational conditions in a median range of atomization pressure. It should be noted that when the atomization pressure is very low (1 kg $cm^{-2}$), the granule size is very high (up to 8 $\mu$m), which is outside the conditions of this equation.

TABLE 2

Determination of the relationship between granule size and spray conditions
$D_{mean} = CP^{-n}\, \eta^r\, p^{-t}$ (n = 0.17, r = 0.07, t = 0.39, C = 1.23)

| P (kg $cm^{-2}$) | p (vol %) | $\eta$ (cst) | $D_{exp}$ ($\mu$m) | $D_{cal}$ ($\mu$m) |
|---|---|---|---|---|
| 3 | 0.25 | 2.1 | 1.487 | 1.845 |
| 3 | 0.167 | 2.038 | 1.733 | 2.155 |
| 5 | 0.25 | 1.8 | 1.373 | 1.672 |
| 3 | 0.25 | 45.9 | 1.797 | 2.269 |
| 3 | 0.125 | 1.82 | 2.6103 | 2.395 |
| 5 | 0.25 | 1.82 | 2.06 | 1.673 |
| 3 | 0.25 | 11.7 | 3.042 | 2.072 |

Thermal stability

Figure 15:
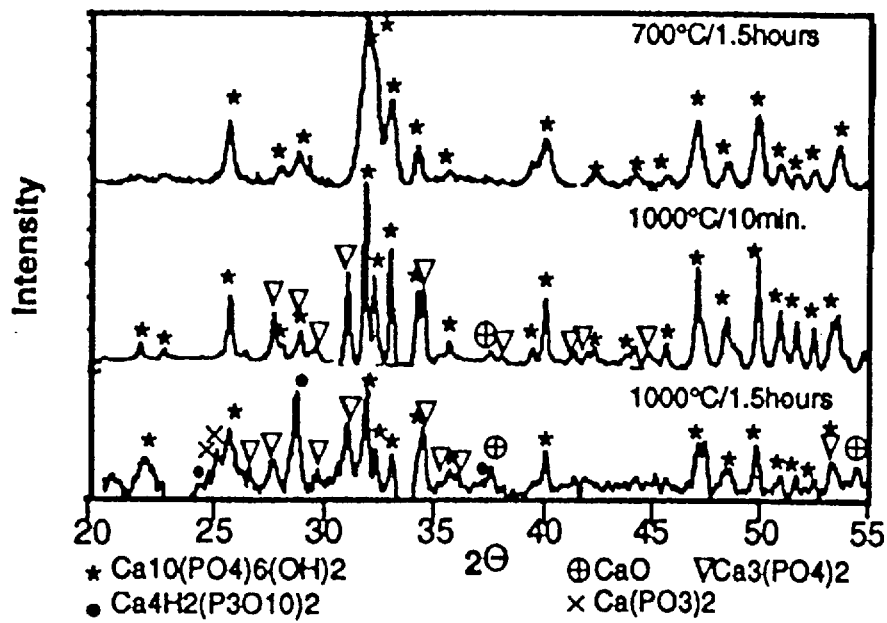
FIG. 15 is an X-ray diffraction analysis of hydroxyapatite powder sintered 700° C. for 1.5 hours.

Hydroxyapatite becomes unstable at 1000° C.; phase decomposition occurs after heat treating (calcinating) the spray dried powder at 1000° C. for 10 min (see the middle of FIG. 15). The whitlockite $Ca_3(PO_4)_2$ and lime CaO phases begin to form but the major phase is $Ca_{10}(PO_4)_6(OH)_2$. In this case, the reaction can be described by:

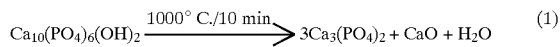

$$Ca_{10}(PO_4)_6(OH)_2 \xrightarrow{1000° C./10 \text{ min}} 3Ca_3(PO_4)_2 + CaO + H_2O \quad (1)$$

TABLE 3

Average crystallite size under various processing conditions.

| | Crystallite size (nm) | Conditions (all in air) |
|---|---|---|
| Spray dried | 20 | 700° C. for 1.5 hours |
| Powder | 42 | 1000° C., 10 min |
| | 55 | 1000° C., for 1.5 hours |

A longer thermal exposure (e.g., 1.5 hours) at 1000° C. causes further decomposition of $Ca_{10}(PO_4)_6(OH)_2$ and the formation of other phases, e.g., calcium phosphate $Ca(PO_3)_2$, calcium hydrogen phosphate, and $Ca_4H_2(P_3O_{10})_2$. Despite this decomposition, the major phase is still hydroxyapatite $Ca_{10}(PO_4)_6(OH)_2$. The following chemical reactions are proposed to describe the phase decomposition:

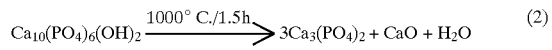

$$Ca_{10}(PO_4)_6(OH)_2 \xrightarrow{1000° C./1.5h} 3Ca_3(PO_4)_2 + CaO + H_2O \quad (2)$$

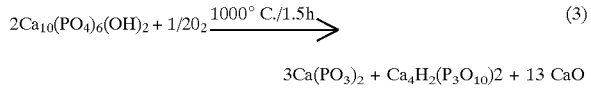

$$2Ca_{10}(PO_4)_6(OH)_2 + 1/2O_2 \xrightarrow{1000° C./1.5h}$$
$$3Ca(PO_3)_2 + Ca_4H_2(P_3O_{10})2 + 13 \text{ CaO} \quad (3)$$

It is pointed out that Reaction (3) involved both the decomposition and oxidation processes. Reaction (2) is predicted by the phase diagram (de Groot et al., HANDBOOK OF BIOACTIVE CERAMICS VOL. II: CALCIUM PHOSPHATE AND HYDROXYAPATITE CERAMICS (eds. Yamamuro et al., CRC Press, Fla, 1990), but Reaction (3) has not been reported previously. It is worth noting that all dehydrated high-temperature calcium phosphates interact with water, or body fluids, at 37° C. to form HA. Therefore, the decomposition of HA during high temperature processing may be of little consequence for many biomaterials applications.

Formation of hollow, solid, and doughnut structures

Hollow spheres were obtained by spraying a solution that did not contain precipitates. During spraying, the solution stream was broken down into fine droplets by the pressurized gas. The surface temperature of the droplet quickly reached the drying temperature of 200° C., and the surface moisture began to evaporate. When the moisture content on the droplet surface fell below the critical value, solute crystallization (i.e., precipitation) occurred. If the moisture evaporation rate exceeds the rate of solute diffusion back into the droplet interior, the solute precipitates at the droplet surface and forms a shell. At the same time, internal pressure is built up in the droplet by the moisture. If the shell is porous, this pressure would be released and a hollow sphere would be formed. If the shell is non-porous, a hollow sphere would be erupted under the high internal pressure.

Solid spheres and doughnut-shaped structures were produced from slurries containing insoluble precipitates. In these cases, the surface temperature of the droplets exceeded the boiling temperature of the water during drying. The evaporation of water is faster than that of the solution, because there is no precipitation process involved in the former process. Moisture rapidly flows to the droplet surface by capillary action. In a dense slurry, a thick shell of insoluble precipitates quickly forms. As a result, heat transfer into the interior of the droplet becomes difficult and the temperature at the interior can never reach the boiling point. The drying process is thereby controlled by the outward diffusion process of water. This leads to the formation of solid spheres; the denser the starting slurry, the denser the solid sphere.

In a dilute slurry, however, the mobility of the insoluble precipitates in the droplet is high. Under external forces (e.g., gravitational force), these insoluble particles tend to move to the bottom and elongate the droplet into an elliptical shape. This increases the surface area of the droplet and, thus, the associated surface tension. At the moment the droplet detaches from the stream, a strong effect of surface spring-back occurs, following the tendency to minimize the surface-to-volume ratio. The spring-back action leads to the inward collapse of the opposite faces of the elongated drop and the formation of a doughnut-shaped granule. The mechanism of doughnut formation has been described previously by several authors. (See, e.g., Charlesworth (1960) AIChEJ 6(1):9; Kirk et al. (1995) J. Mater. Sci. 30:2171–2175; Konsztowicz et al. (1990) E. Ceram. Trans. 26:46. The drying process, however, is also diffusion controlled, similar to that for the solid-sphere formation.

Using the methods described herein, hydroxyapatite granules are produced with different morphologies using a chemical precipitation and spray-drying method. The spray-dried granules were doughnut-shaped, solid spheres, or hollow spheres, and their sizes were controlled by varying the atomization pressure and the concentration of the feed slurry. The morphology of the granules varied with the concentration of the feed slurry. Solid spheres were obtained from a concentrated slurry, and in contrast, doughnut-shaped granules were obtained from a dilute slurry. A higher atomization pressure produced finer granules with a narrower granule distribution. The size distribution of spray-dried granules followed the log normal type. A quantitative relationship between granule size and spray conditions (e.g., pressure and the concentration and viscosity of the spray slurry) was developed.

Example 2

Preparation of Controlled Morphology, Porous Hydroxyapatite Granules

Granular hydroxyapatite was also made into round, hollow or doughnut morphologies having cellular structure (e.g., pores or channels) therein. Calcium hydroxide or calcium nitrate was dissolved into a saturated ammonium hydroxide solution at pH greater than 11. Phosphoric acid or ammonium phosphate was added into the solution dropwise to a Ca/P ratio of 1.5 to 1.7 to form a slurry of hydroxyapatite fine crystals.

The resulting slurry of HA and ammonium hydroxide was spray-dried at room temperature, 50° C. or 150° C., depending upon how much residual ammonium hydroxide was to be retained in the wet granular. The more ammonium hydroxide retained, the more pores created in the HA.

Figure 16:
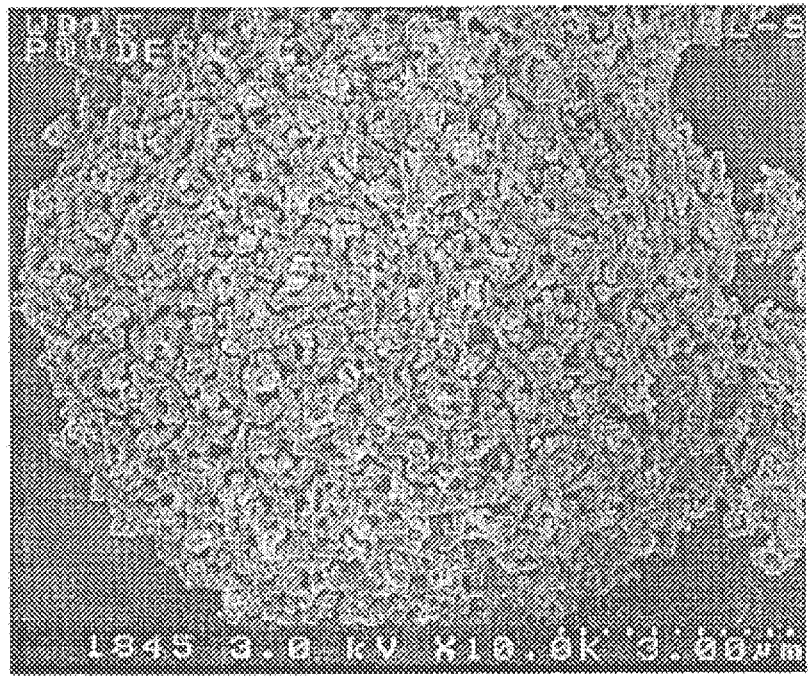
FIG. 16 is a scanning electron micrograph of the surface of a spherical granule showing the homogenous cellular structure.
Figure 17:
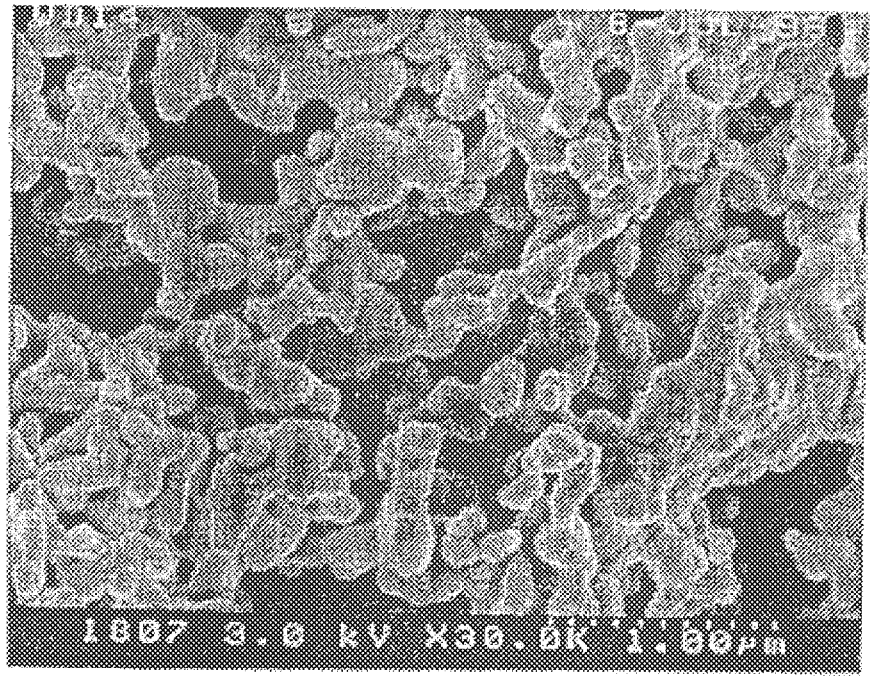
FIG. 17 is a scanning electron micrograph showing a spherical granule at higher magnification to show the interconnected channels ranging in size up to 3000 Å that form due to the sintering of the hydroxyapatite crystal grains. Upon sintering, the grains form struts which account for the homogenous cellular structure of the sphere.

The residual ammonium hydroxide was converted into gas phase by heating the spray-dried granules to between 400° C. and 500° C. When the ammonium hydroxide is vaporized or decomposed, the pores are created within the HA. As shown in FIGS. 16 and 17, the heating step also serves to form interconnected channels within the HA of up to 3000 Å.

Sintering of the HA particles was conducted in a furnace between 900° C. and 1100° C. to form the strut, that is to connect the fine grains of the HA. particles. The process described herein using ammonium hydroxide as a matrix has the advantage of producing homogenous pores or channels. As shown in FIGS. 16 and 17, the channels are formed homogeneously throughout the HA particles.

Example 3

Preparation of Non-Porous, Controlled Morphology Hydroxyapatite in Ammonium Hydroxide A slurry of hydroxyapatite in saturated ammonium hydroxide was prepared as described in Example 2. The resulting slurry was washed and centrifuged to totally remove ammonium hydroxide. The particles were spray-dried at 200° C., and any residual water removed by heating to 400° C. to 500° C. The particles were sintering as described in Example 2. The hydroxyapatite particles obtained by this process are non-porous, but have controlled morphology.

Modifications of the above-described modes for carrying out the invention that are obvious to those of skill in the fields of chemistry, chromatography, bioimplants, material science and related fields are intended to be within the scope of the following claims.

I claim:

1. A method for synthesizing non-porous hydroxyapatite materials of controlled morphology comprising:
    (a) preparing a hydroxyapatite slurry;
    (b) adjusting the concentration, viscosity and pH values of the hydroxyapatite slurry to a concentration ranging from about 0 volume fraction to about 0.25 volume fraction and a viscosity ranging from about 0.5 cst to about 50 cst;
    (c) spray drying the hydroxyapatite slurry to form granules using atomization pressure ranging from about 1 kg/cm$^2$ to about 5 kg/cm$^2$, and optionally, employing a heated coaxial air;
    (d) heating the spray-dried granules to a temperature ranging from about 400° C. to about 500° C. to remove residual water;
    (e) collecting the hydroxyapatite granules of step (d) wherein the concentration, viscosity and pH values of the hydroxyapatite slurry and the atomization pressure are varied to produce non-porous granules of 8 μm or less and a controlled morphology selected from the group consisting of hollow spheres and doughnuts; and
    (f) sintering the collected granules from step (e) to form ceramic hydroxyapatite hollow spheres and doughnuts.

2. The method according to claim 1, further wherein the hydroxyapatite slurry is centrifuged and then washed to remove any residual ammonium prior to step (b).

3. The method according to claim 1, wherein the calcium and phosphate are present in the hydroxyapatite in a ratio ranging from about 1.5 to about 1.8.

4. The method according to claim 1, wherein the coaxial flow is approximately from 0.5 to 1.0 m$^3$/min.

5. The method according to claim 1, wherein the hydroxyapatite granules are sintered from about 10 minutes to about 1.5 hours.

6. A method for producing controlled morphology hydroxyapatite granules having cellular structures comprising the steps of:
    (a) preparing a hydroxyapatite slurry containing saturated ammonium hydroxide;
    (b) adjusting the concentration of the hydroxyapatite slurry up to 0.5 volume fraction and the viscosity to a range from about 0.5 cst to about 50 cst;
    (c) spray drying the hydroxyapatite slurry containing saturated ammonium hydroxide at a temperature ranging from about 25° C. to about 150° C. to form hydroxyapatite granules;
    (d) collecting the hydroxyapatite granules of step (c) wherein the spray temperature, the concentration, the viscosity of the hydroxyapatite slurry, and the spray atomization pressure are varied to produce hydroxyapatite granules containing residual ammonium hydroxide;
    (e) heating the collected granules from step (d) from 400°–500° C. to form cellular hydroxyapadite granules; wherein the temperature of the spray-drying in step (c) correlates to the amount of residual ammonium hydroxide which vaporizes or decomposes during the post heating process resulting in the size and number of interconnected pores; and
    (f) sintering the granules of step (e) at about 900° C. to about 1100° C. to allow for formation of struts to form cellular ceramic hydroxyapatite granules.

7. The method according to claim 6, wherein the calcium and phosphate are present in the hydroxyapatite in a ratio ranging from about 1.5 to about 1.8.

8. The method according to claim 6, wherein the hydroxyapatite granules are sintered for from about 10 minutes to about 1.5 hours.

9. The method according to claim 6, wherein the atomization pressure ranges from about 1 kg/cm$^2$ to about 5 kg/cm$^2$.

10. The method according to claim 6, wherein the cellular granules have interconnected channels and struts.

11. The method according to claim 6, wherein the cellular ceramic hydroxyapatite granules are spheres and doughnuts.

* * * * *